US008937276B2

(12) United States Patent
Funasaka

(10) Patent No.: US 8,937,276 B2
(45) Date of Patent: Jan. 20, 2015

(54) OPTICAL FILTER AND OPTICAL MODULE PROVIDED WITH SAME

(71) Applicant: Seiko Epson Corporation, Tokyo (JP)

(72) Inventor: Tsukasa Funasaka, Nagano (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 14/086,292

(22) Filed: Nov. 21, 2013

(65) Prior Publication Data
US 2014/0078588 A1  Mar. 20, 2014

Related U.S. Application Data

(63) Continuation of application No. 13/655,963, filed on Oct. 19, 2012, now Pat. No. 8,618,463, which is a continuation of application No. 12/710,426, filed on Feb. 23, 2010, now Pat. No. 8,319,169.

(30) Foreign Application Priority Data

Mar. 4, 2009 (JP) ................. 2009-050791

(51) Int. Cl.
H01J 5/16 (2006.01)
G02B 27/00 (2006.01)
G02B 5/28 (2006.01)

(52) U.S. Cl.
CPC .............. *G02B 5/28* (2013.01); *G02B 27/0006* (2013.01)
USPC .......................... 250/216; 359/578

(58) Field of Classification Search
CPC ...... G01J 3/26; G02B 26/001; G02B 6/29358; G02B 6/29395
USPC ................. 250/216; 359/578, 224.1, 850
See application file for complete search history.

(56) References Cited

U.S. PATENT DOCUMENTS

| 7,301,703 | B2 | 11/2007 | Nakamura et al. | |
| 7,583,418 | B2 * | 9/2009 | Mestha et al. | ............. 358/504 |
| 2001/0015810 | A1 | 8/2001 | Hara et al. | |
| 2003/0116711 | A1 | 6/2003 | Hara et al. | |
| 2006/0066876 | A1 | 3/2006 | Kothari | |
| 2007/0242358 | A1 | 10/2007 | Lin et al. | |
| 2007/0242920 | A1 | 10/2007 | Lin et al. | |
| 2009/0141286 | A1 | 6/2009 | Kothari | |

FOREIGN PATENT DOCUMENTS

| JP | 2000-162516 A | 6/2000 |
| JP | 2001-228022 A | 8/2001 |
| JP | 2002-232049 A | 8/2002 |

(Continued)

*Primary Examiner* — Thanh Luu
(74) *Attorney, Agent, or Firm* — Global IP Counselors, LLP

(57) ABSTRACT

An optical filter includes first and second substrates, first and second mirrors and first and second electrodes. The second substrate includes first, second and third surfaces. The second surface surrounds the first surface in a plan view, and the third surface surrounds the second surface in a plan view. A second height of the second surface is lower than a first height of the first surface, and a third height of the third surface is higher than the first height of the first surface. The first, second and third surfaces face a single flat surface of the first substrate. The first mirror is disposed on the first substrate. The second mirror is disposed on the first surface of the second substrate. The first electrode is disposed on the first substrate. The second electrode is disposed on the second surface of the second substrate and faces the first electrode.

5 Claims, 3 Drawing Sheets

(56) References Cited

FOREIGN PATENT DOCUMENTS

| JP | 2003-057438 A | 2/2003 |
| JP | 2006-091854 A | 4/2006 |
| JP | 2008-116669 A | 5/2008 |

* cited by examiner

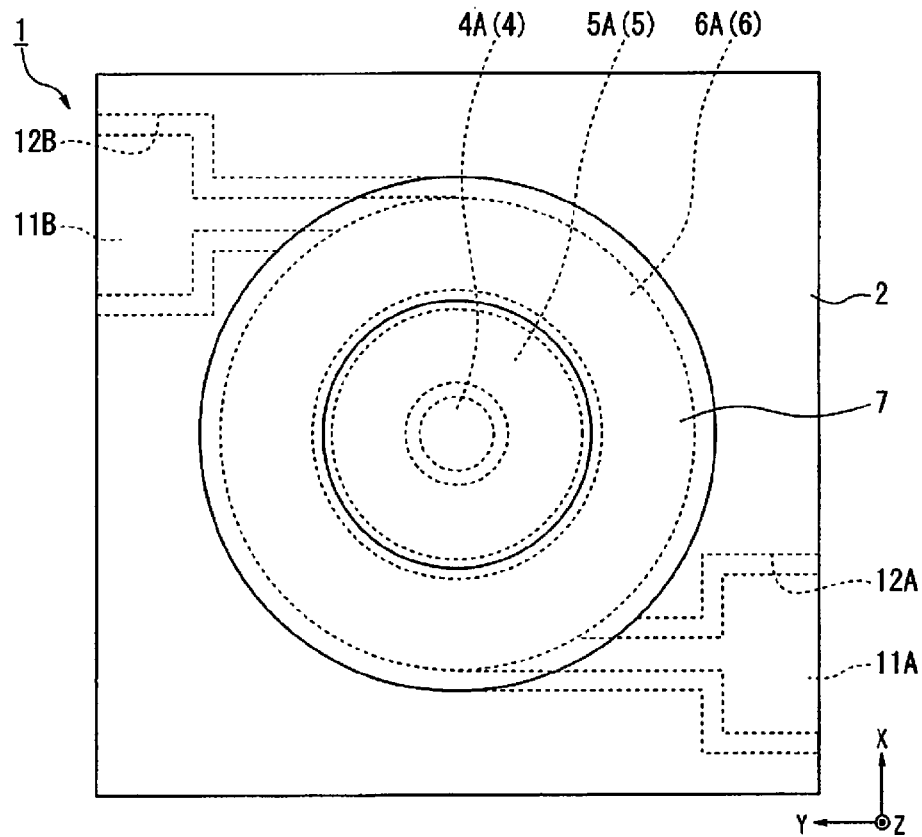
F I G. 1
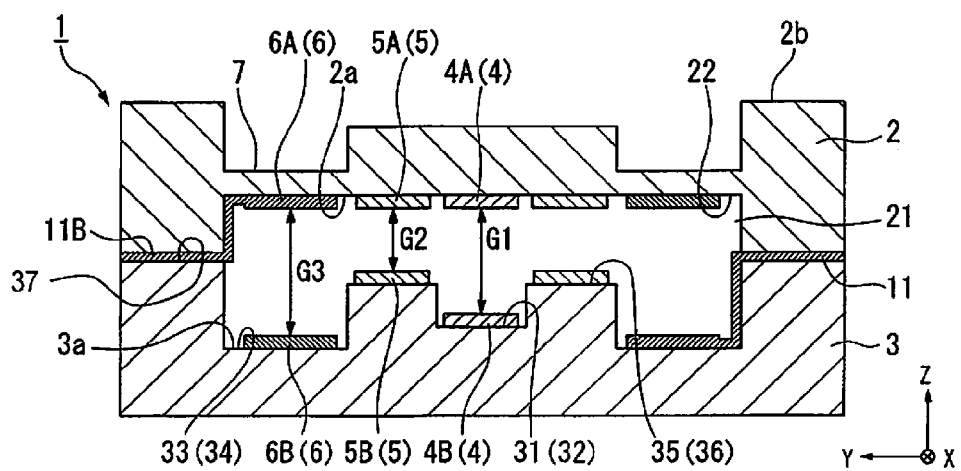
F I G. 2

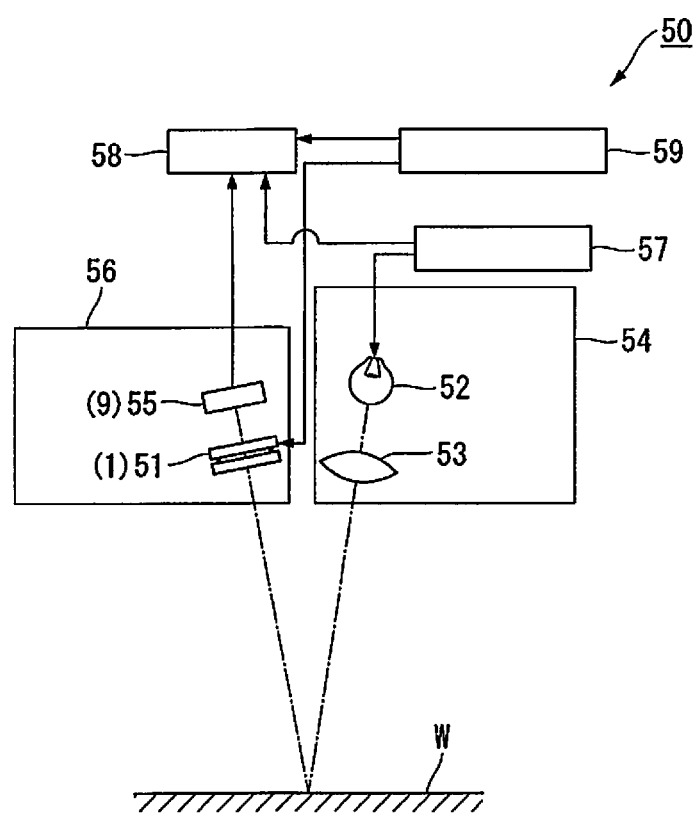
F I G. 5

US 8,937,276 B2

OPTICAL FILTER AND OPTICAL MODULE PROVIDED WITH SAME

CROSS-REFERENCE TO RELATED APPLICATIONS

This application is a continuation application of U.S. patent application Ser. No. 13/655,963 filed on Oct. 19, 2012, which is a continuation application of U.S. patent application Ser. No. 12/710,426 filed on Feb. 23, 2010, now U.S. Pat. No. 8,319,169. This application claims priority to Japanese Patent Application No. 2009-050791 filed on Mar. 4, 2009. The entire disclosures of U.S. patent application Ser. Nos. 13/655, 963 and 12/710,426 and Japanese Patent Application No. 2009-050791 are hereby incorporated herein by reference.

BACKGROUND

1. Technical Field

The present invention relates to an optical filter and to an optical module that is provided with the optical filter.

2. Related Art

Conventional air-gap-type electrostatically actuated optical filters are known as optical filters for selectively emitting a desired wavelength of light from among all the wavelengths of an incident light. In such filters, a pair of substrates are arranged facing each other, a mirror is provided to each of the opposing surfaces of the substrates, electrodes are provided on the periphery of the mirrors, a diaphragm portion is provided on the periphery of one mirror, and the diaphragm portion is displaced by electrostatic force between the electrodes to vary the gap (air gap) between the mirrors, whereby the desired wavelength of light is extracted (see Japanese Laid-Open Patent Publication No. 2003-57438 and Japanese Laid-Open Patent Publication No. 2008-116669, for example).

In this type of optical filter, the wavelength of light that corresponds to the gap between the mirrors can be selectively extracted by varying the gap between the mirrors.

SUMMARY

An optical filter according to one aspect includes first and second substrates, first and second mirrors and first and second electrodes. The first substrate has a single flat surface. The second substrate includes a first surface, a second surface and a third surface. The second surface surrounds the first surface in a plan view. The third surface surrounds the second surface in a plan view. A second height of the second surface is lower than a first height of the first surface. A third height of the third surface is higher than the first height of the first surface. The first surface, the second surface, and the third surface face the single flat surface of the first substrate. The first mirror is disposed on the first substrate. The second mirror is disposed on the first surface of the second substrate, the second mirror facing the first mirror. The first electrode is disposed on the first substrate. The second electrode is disposed on the second surface of the second substrate. The second electrode faces the first electrode.

BRIEF DESCRIPTION OF THE DRAWINGS

Referring now to the attached drawings which form a part of this original disclosure:

FIG. 1 is a schematic plan view showing the optical filter according to an embodiment of the present invention;

FIG. 2 is a schematic sectional view showing the optical filter according to an embodiment of the present invention;

FIG. 5 is a schematic structural view showing an embodiment of the optical module of the present invention.

DETAILED DESCRIPTION OF EXEMPLARY EMBODIMENTS

Figure 3:
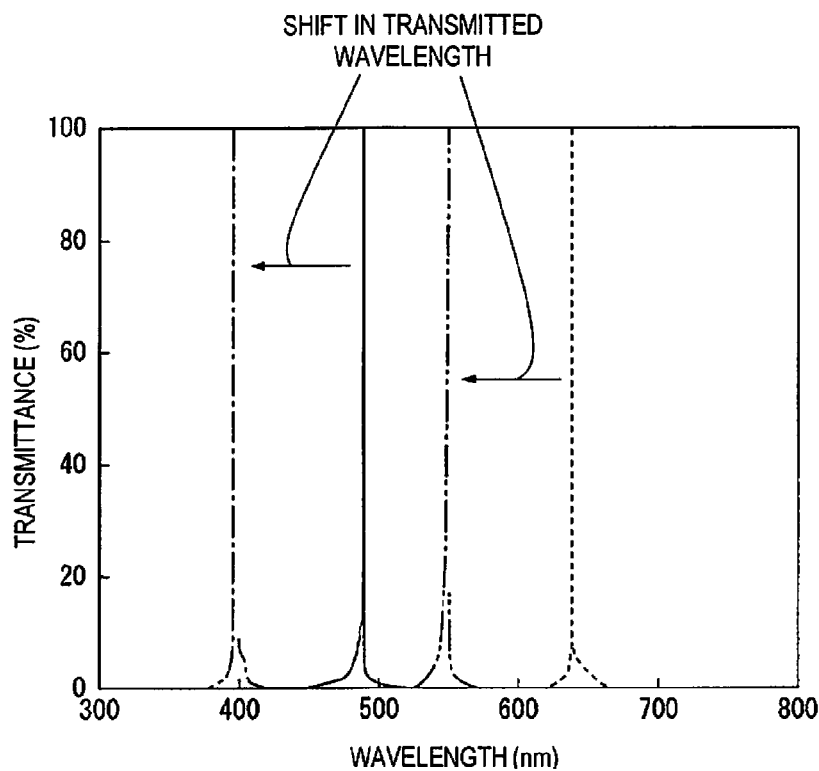
FIG. 3 is a view showing the relationship between the wavelength and transmittance in the optical filter according to an embodiment of the present invention.

Preferred embodiments of the optical filter and optical module provided with the optical filter of the present invention will next be described.

An air-gap-type electrostatically actuated optical filter will be described as the optical filter.

In the following description, an XYZ orthogonal coordinate system is set, and the positional relationships of members will be described with reference to this XYZ orthogonal coordinate system as needed. In this system, a predetermined direction in the horizontal plane is designated as the X-axis direction, the direction orthogonal to the X-axis direction in the horizontal plane is designated as the Y-axis direction, and the direction orthogonal to the X-axis direction and Y-axis direction (i.e., the vertical direction) is designated as the Z-axis direction.

FIG. 1 is a plan view showing the optical filter of the present embodiment, and FIG. 2 is a sectional view showing the optical filter of the present embodiment. In FIGS. 1 and 2, the reference numeral 1 refers to an optical filter composed of an air-gap-type electrostatically actuated etalon element.

The optical filter 1 of the present embodiment is composed of a first substrate 2; a second substrate 3 joined (or bonded) to the first substrate 2 so as to face the first substrate 2; a circular first mirror pair 4 provided at the center of the surfaces 2a, 3a on the opposing sides of the first substrate 2 and the second substrate 3, respectively; a ring-shaped second mirror pair 5 provided on the periphery of the first mirror pair 4; a ring-shaped electrode pair 6 provided on the periphery of the second mirror pair 5; and a diaphragm portion 7.

The first mirror pair 4 and second mirror pair 5 are each composed of a pair of mirrors facing each other, and among the first mirror pair 4 and the second mirror pair 5, the pair of mirrors provided to the deformable first substrate 2 are referred to as movable mirrors 4A, 5A (the mirror 4A is an example of a first mirror), and the pair of mirrors provided to the non-deforming second substrate 3 are referred to as fixed mirrors 4B, 5B (the mirror 4B is an example of a second mirror).

A step 21 is formed at the peripheral edge of an opposing surface 2a of the first substrate 2, a movable portion 22 composed of a concave portion is formed by the step 21, and a first movable mirror 4A, a second movable mirror 5A, and an electrode (a first electrode) 6A are accommodated within the movable portion 22.

A first step (a first surface) 31 that forms a circle is formed in the center of an opposing surface 3a of the second substrate 3, and a first step portion 32 (light transmissive portion) composed of the concave portion formed by the first step 31 is formed in the center of the opposing surface 3a of the second substrate 3. A ring-shaped second step (a second surface) 33 concentric with the first step portion 32 is formed on the peripheral edge of the opposing surface 3a of the second substrate 3, and a second step portion 34 composed of the concave portion formed by the second step 33 is formed on the peripheral edge of the opposing surface 3a of the second substrate 3. A third surface 37 surrounds the second step 33 in the plan view. As shown in FIG. 2, a height of the second surface in the second step 33 is lower than a height of the first surface in the first step 31, and a height of the third surface 37 is higher than the height of the first surface in the first step 31.

A third step 35 composed of a naturally ring-shaped convex portion is formed in the portion flanked by the two concave portions described above provided to the opposing surface 3a, i.e., at the boundary between the first step portion 32 and the second step portion 34, and a third step portion 36 (light transmissive portion) is provided.

The top surface and the bottom surfaces of the movable step portion 22, first step portion 32, second step portion 34, and third step portion 36 are parallel to each other; and the first mirror pair 4, second mirror pair 5, and electrode pair 6 provided to the step portions are each maintained parallel to each other via a respective gap.

A first fixed mirror 4B is provided via a first gap G1 to the bottom portion of the first step portion 32 so as to face and form a pair with a first movable mirror 4A. In the same manner, a second fixed mirror 5B is provided via a second gap G2 to the top surface of the third step portion 36 so as to face and form a pair with a second movable mirror 5A. A fixed electrode (a second electrode) 6B is also provided via a third gap G3 to the bottom portion of the second step portion 34 so as to face and form a pair with a movable electrode 6A.

A ring-shaped diaphragm portion 7 having a small wall thickness formed by etching (selective removal) is formed on an external side surface 2b of the first substrate in a position that substantially corresponds to the external peripheral portion of the movable electrode 6A, and the diaphragm portion 7 and the electrode pair 6 provided facing each other via the third gap G3 constitute an electrostatic actuator.

The first substrate 2 and second substrate 3 are both rectangles (squares) of optically transparent material (light transmissive material) having insulation properties, and are preferably composed particularly of glass or another transparent material.

Specific examples of glass that can be suitably used include soda glass, crystallized glass, quartz glass, lead glass, potassium glass, borosilicate glass, sodium borosilicate glass, non-alkali glass, and the like.

Making both the first substrate 2 and the second substrate 3 an optically transparent material enables electromagnetic waves or visible light rays having the desired wavelength spectrum to be used as the incident light. Moreover, forming both the first substrate 2 and the second substrate 3 out of a semiconductor material, e.g., silicon, enables near-infrared rays to be used as the incident light.

The first movable mirror 4A, the first fixed mirror 4B, the second movable mirror 5A, and the second fixed mirror 5B are composed of dielectric multilayer films in which a plurality of high-refractive-index layers and low-refractive-index layers is layered in alternating fashion, and the mirrors may have the same composition as each other or different compositions. The first mirror pair 4 and second mirror pair 5 are not limited to dielectric multilayer films, and a carbon-containing silver alloy film or the like, for example, may also be used.

When the optical filter 1 is used in the visible light region or the infrared region, titanium oxide ($Ti_2O$), tantalum oxide ($Ta_2O_5$), niobium oxide ($Nb_2O_5$), or the like, for example, is used as the material for forming the high-refractive-index layers in the dielectric multilayer film. When the optical filter 1 is used in the ultraviolet region, aluminum oxide ($Al_2O_3$), hafnium oxide ($HfO_2$), zirconium oxide ($ZrO_2$), thorium oxide ($ThO_2$), or the like, for example, is used as the material for forming the high-refractive-index layers. Magnesium fluoride ($MgF_2$), silicon dioxide ($SiO_2$), or the like, for example, is used as the material for forming the low-refractive-index layers in the dielectric multilayer film.

The thickness and number of layers of high-refractive-index layers and low-refractive-index layers are appropriately set based on the required optical characteristics. In general, when a reflective film (mirror) is formed by a dielectric multilayer film, the number of layers needed to obtain the optical characteristics is 12 or more.

In the electrode pair 6, an electrostatic force is generated between the electrodes 6A, 6B according to an inputted drive voltage, and the electrode pair 6 constitutes an electrostatic actuator for moving the first mirror pair 4 and second mirror pair 5 relative to each other in a state in which the mirrors are facing each other.

The electrode pair 6 is configured so that the diaphragm portion 7 is displaced in the vertical direction in FIG. 2, the first gap G1 between the first mirror pair 4 and the second gap G2 between the second mirror pair 5 are each varied, and wavelengths of light corresponding to the first gap G1 and the second gap G2 are individually emitted.

The material for forming the electrode pair 6 is not particularly limited insofar as the material is conductive, and examples of materials that can be used include Cr, Al, Al alloy, Ni, Zn, Ti, Au, and other metals; resins in which carbon, titanium, or the like is dispersed; polycrystalline silicon (polysilicon), amorphous silicon, and other silicon; silicon nitride, ITO, and other transparent conductive materials; and other materials.

As shown in FIG. 1, interconnections 11A, 11B are connected to the electrodes 6A, 6B, and the electrodes 6A, 6B are connected to a power supply (not shown) via the interconnections 11A, 11B.

The interconnections 11A, 11B are formed in an interconnection groove 12A formed in the first substrate 2, or an interconnection groove 12B formed in the second substrate 3. Consequently, there is no interference at the junction of the first substrate 2 and second substrate 3.

A power supply drives the electrodes 6A, 6B by application of a voltage to the electrodes 6A, 6B as a drive signal, and generates a desired electrostatic force between the electrodes 6A, 6B. A control device (not shown) is connected to the power supply, and the power supply is controlled by the control device, whereby the difference of potential between the electrodes 6A, 6B can be adjusted.

The diaphragm portion 7 is thinner than the portion of the first substrate 2 in which the diaphragm portion 7 is not formed. The area of the first substrate 2 thinner than the remainder thereof is therefore elastic (flexible) and capable of deformation (displacement). Through this configuration, the diaphragm portion 7 varies the first gap G1 and second gap G2 to change the gap intervals of the first mirror pair 4 and second mirror pair 5 to the interval that corresponds to the desired wavelength of light. The optical filter 1 thus has a wavelength selection capability for emitting desired wavelengths of light.

The shape or thickness of each of the diaphragm portions 7 is arbitrary insofar as light in the desired wavelength range is emitted. Specifically, these characteristics are set with consideration for the amount of variation, rate of variation, and other characteristics of the intervals of the gaps G1, G2 of the first mirror pair 4 and second mirror pair 5, and in accordance with the wavelength range of emitted light needed from the optical filter 1.

A circular step 21 is formed in the first substrate 2 to provide the movable step portion 22 in the present embodiment, but a plurality of movable step portions divided for each mirror and electrode may also be formed on the opposing surface 2a in the same manner as in the second substrate 3. Conversely, a configuration may also be adopted in which no steps are provided to the first substrate 2, and the opposing surface 2a is directly utilized as a movable portion.

The shape and height of each step of the second substrate 3 are also not limited by the present embodiment, and it is sufficient insofar as the gaps G1, G2 between the mirror pairs are each different. For example, the first step portion 32 may be a convex portion and the third step portion 36 may be a concave portion.

In the present embodiment, the first fixed mirror 4B, the second fixed mirror 5B, and the fixed electrode 6B are provided to the opposing surface 3a each via a gap G1, G2, G3 of a different size, but a configuration may also be adopted in which any one of the first fixed mirror 4B and second fixed mirror 5B is positioned in the same plane as the fixed electrode 6B, and the size of one of the first gap G1 and second gap G2 is equal to that of the third gap G3.

Moreover, the number of mirror pairs provided to the optical filter 1 is not limited by the present embodiment, and more mirrors may be provided, but an excessively large number of mirrors is impractical. This is due to the increased cost of forming the same number of steps as mirrors on the substrate surface, and the space requirements for aligning numerous mirrors.

Light division using the optical filter 1 of the present embodiment will next be described.

In the optical filter 1 of the present embodiment, when a voltage is not applied between the electrode 6A and electrode 6B, first movable mirror 4A and the first fixed mirror 4B face each other across the first gap G1. In the same manner, the second movable mirror 5A and the second fixed mirror 5B face each other across the second gap G2.

Therefore, when light is incident on the optical filter 1, a wavelength of light that corresponds to the first gap G1 is emitted by the first mirror pair 4; e.g., light having a wavelength of 480 nm is emitted, as indicated by the solid line in FIG. 3. A wavelength of light that corresponds to the second gap G2, e.g., light having a wavelength of 630 nm, is emitted by the second mirror pair 5, as indicated by the dashed line in FIG. 3.

Since the first mirror pair 4 and the second mirror pair 5 are each arranged parallel in an independent state, light that corresponds to the gap G1, G2 of each mirror pair is diffracted simultaneously without interference. In the optical filter 1, two different wavelengths of light can thus be diffracted simultaneously without interfering with each other.

When the control device and power supply are driven, and a voltage is applied between the electrode 6A and the electrode 6B, an electrostatic force corresponding to the size of the voltage (potential difference) is generated between the electrode 6A and electrode 6B. The control device thus controls the power supply, whereby the desired voltage can be applied between the electrodes 6A, 6B, and the desired electrostatic force can be generated between the electrode 6A and electrode 6B.

When the desired electrostatic force is generated between the electrodes 6A, 6B, the electrodes 6A, 6B are pulled toward each other by the electrostatic force, and the first substrate 2 deforms so as to flex toward the second substrate 3. The first gap G1 of the first mirror pair 4 and the second gap G2 of the second mirror pair 5 are then maintained as gaps G1', G2' that are smaller than when a voltage was not applied.

When light is incident on the optical filter 1 in this state, the transmitted wavelengths are both shifted to shorter wavelengths that correspond to the first gap GF and the second gap G2'.

Light having a wavelength of 400 nm, for example, is emitted by the first mirror pair 4, as indicated by the single-dot dashed line in FIG. 3, and light having a wavelength of 550 nm, for example, is emitted by the second mirror pair 5, as indicated by the double-dot dashed line in FIG. 3.

Two different wavelengths can thus be simultaneously shifted in the optical filter 1 and individually emitted.

Through the optical filter 1 of the present embodiment as described above, by providing a plurality of step portions 32, 35 composed of steps 31, 33 having mutually different heights to the opposing surface 3a of the second substrate 3, gaps G1, G2 having different sizes are formed between the first substrate 2 and the second substrate 3, and by providing two mirror pairs 4, 5 to the step portions via the gaps G1, G2, an optical filter can be provided that is capable of diffracting light into a plurality of wavelengths individually and simultaneously.

An embodiment of an optical sensor provided with the optical filter 1 will next be described as an example of an application of the optical filter 1 of the present embodiment.

Figure 4:
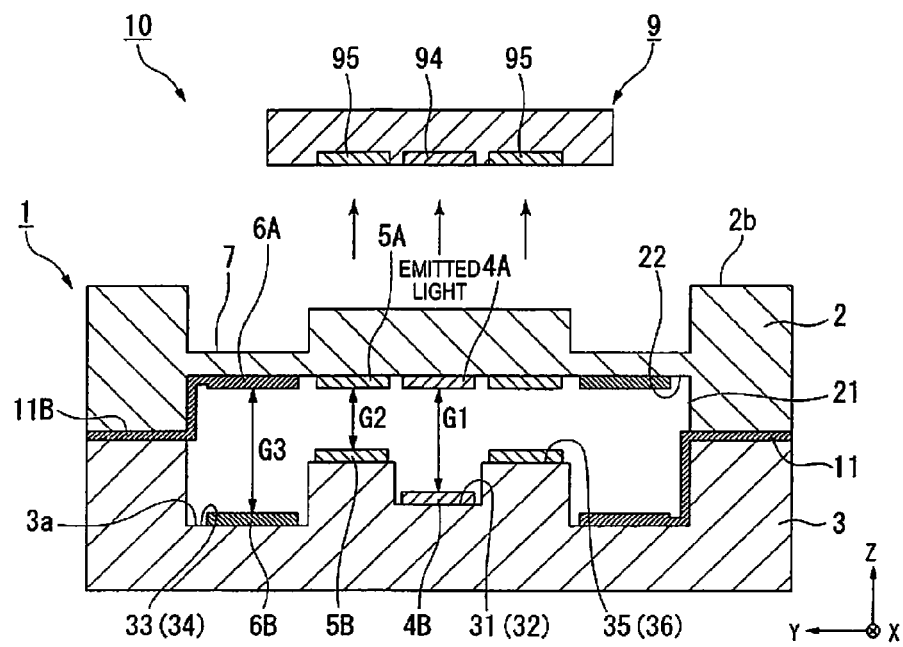
FIG. 4 is a schematic sectional view showing the optical sensor according to an embodiment of the present invention.

FIG. 4 is a schematic sectional view showing the structure of the optical sensor of the present embodiment, wherein the reference numeral 10 refers to the optical sensor of the present embodiment. The same reference numerals are used in FIG. 4 to refer to members that are the same as those of the optical filter 1 shown in FIGS. 1 and 2, and no further description of such members will be given.

The optical sensor 10 is provided with a photoreceptor 9 on the emission side of the optical filter 1, and a plurality of photoreceptor elements 94, 95 is provided for individually detecting light that is diffracted by the mirror pairs 4, 5 of the optical filter 1 and emitted. The photoreceptor elements 94, 95 are composed of photodiodes or the like, for example, and are arranged so as to face the emission surfaces of the mirror pairs 4, 5, respectively. The photoreceptor elements 94, 95 receive the emitted light from the optical filter 1 and convert the received light to an electrical signal.

By thus providing a plurality of photoreceptor elements so as to correspond to the number of provided mirror pairs in the optical filter 1, the different wavelengths of light emitted simultaneously and individually by the optical filter 1 can be independently detected.

FIG. 5 is a view showing an embodiment of the optical filter device module of the present invention provided with the optical sensor 10, and in FIG. 5, the reference numeral 50 refers to an optical filter device module.

The optical filter device module 50 is provided with a filter unit 51 composed of the optical filter 1 of the present embodiment, and a detection element 55 composed of the photoreceptor 9 of the present embodiment, and the optical filter device module 50 is configured so that a specific spectrum of light is radiated to a specimen W, a pre-set wavelength of light is selectively extracted (diffracted) from the light reflected by the specimen W, and the intensity of the extracted light is measured.

Specifically, the optical filter device module 50 is provided with a light source optical system 54 for radiating a predetermined light, e.g., visible light or infrared rays, to the specimen W, the light source optical system 54 having a light source 52 and a lens 53; a detector optical system 56 for detecting reflected light from the specimen W, the detector optical system 56 having a filter unit 51 and a detection element 55; a light source control circuit 57 for controlling the illumination intensity and other characteristics of the light source 52; a filter control circuit 58 for controlling the filter unit 51; and a processor 59 for receiving detection signals detected by the detection element 55, the processor 59 being connected to the light source control circuit 57 and the filter control circuit 58.

In such an optical filter device module 50, a specific spectrum of light such as visible light or infrared rays is radiated to the specimen W. Light is then reflected according to the surface state of the specimen W, for example, and other factors, and the reflected light enters the filter unit 51. The filter unit 51 is configured so that a voltage is applied (or not applied) to the electrodes 6A, 6B so that light having a pre-set wavelength is selectively extracted (diffracted). Only a specific wavelength band is thereby selectively extracted from the reflected light and detected by the detection element 55. Consequently, reflected light can be detected with high sensitivity by using a detection element that selectively detects the light extracted by the filter unit 51 as the detection element 55, for example. The optical filter device module 50 thereby enables the surface state and other characteristics of the specimen W to be detected with high sensitivity.

In such an optical filter device module 50, since the optical filter 1 is provided in the filter unit 51, the spectral characteristics of the optical filter 1 can be utilized without modification.

For example, since the optical filter 1 as previously described has such spectral characteristics as shown in FIG. 3, a case will be described in which reflected light is detected when light in the wavelength region of 400 to 700 nm is sequentially scanned and radiated to a specimen W.

Through the shift of transmitted wavelengths such as shown in FIG. 3, light already in the wavelengths of 400 to 550 nm can be diffracted by the first mirror pair 4, and light already in the wavelengths of 550 to 700 nm can be diffracted by the second mirror pair 5. Since this diffraction can be independently and simultaneously performed by each mirror pair, the entire wavelength region to be measured can be divided into a 400 to 550 nm short-wavelength region and a 550 to 700 nm long-wavelength region.

The short-wavelength region is thus sequentially scanned by the first mirror pair 4 and the photoreceptor element 94 and detected, while at the same time, the long-wavelength region is sequentially scanned by the second mirror pair 5 and the photoreceptor element 95 and detected. The wavelength region to be scanned can thereby be reduced substantially by half in comparison to sequentially scanning and detecting the entire wavelength region, and the time needed for detection and measurement can be significantly reduced.

Moreover, even though the optical filter 1 of the present embodiment has mirror pairs 4, 5 that have different spectral characteristics, the optical filter 1 is still substantially the same size as the conventional optical filter. Less space is therefore required relative to a case in which conventional optical filters are arranged within a module, and a smaller-sized optical filter device module 50 can be provided.

GENERAL INTERPRETATION OF TERMS

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. Finally, terms of degree such as "substantially", "about" and "approximately" as used herein mean a reasonable amount of deviation of the modified term such that the end result is not significantly changed. For example, these terms can be construed as including a deviation of at least ±5% of the modified term if this deviation would not negate the meaning of the word it modifies.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing descriptions of the embodiments according to the present invention are provided for illustration only, and not for the purpose of limiting the invention as defined by the appended claims and their equivalents.

What is claimed is:

1. An optical filter comprising:
    a first substrate having a single flat surface;
    a second substrate including a first surface, a second surface and a third surface, the second surface surrounding the first surface in a plan view, the third surface surrounding the second surface in a plan view, a second height of the second surface being lower than a first height of the first surface, a third height of the third surface being higher than the first height of the first surface, the first surface, the second surface, and the third surface facing the single flat surface of the first substrate;
    a first mirror disposed on the first substrate;
    a second mirror disposed on the first surface of the second substrate, the second mirror facing the first mirror;
    a first electrode disposed on the first substrate; and
    a second electrode disposed on the second surface of the second substrate, the second electrode facing the first electrode.

2. The optical filter according to claim 1, wherein
    the first substrate includes a first portion and a second portion surrounding the first portion in the plan view, a first thickness of the first portion is thicker than a second thickness of the second portion; and
    the first mirror is disposed on the single flat surface in the first portion of the first substrate.

3. The optical filter according to claim 1, wherein
    the first substrate includes a first portion and a groove portion surrounding the first portion in the plan view as viewed from an opposite side to the single flat surface, and
    the first mirror is disposed on the single flat surface in the first portion of the first substrate.

4. The optical filter according to claim 1, wherein
    the first substrate and the second substrate are made of light transmissive material.

5. The optical filter according to claim 1, wherein
    at least one of the first substrate and the second substrate is made of glass.

* * * * *